(12) United States Patent
Kraffert

(10) Patent No.: US 6,625,598 B1
(45) Date of Patent: Sep. 23, 2003

(54) DATA VERIFICATION SYSTEM AND TECHNIQUE

(75) Inventor: Mark J. Kraffert, Meridian, ID (US)

(73) Assignee: MPC Computers, LLC, Nampa, ID (US)

( * ) Notice: Subject to any disclaimer, the term of this patent is extended or adjusted under 35 U.S.C. 154(b) by 358 days.

(21) Appl. No.: 09/696,631

(22) Filed: Oct. 25, 2000

(51) Int. Cl.[7] .............................................. G06F 17/30
(52) U.S. Cl. .............................. 707/3; 703/16; 703/30
(58) Field of Search ........................... 707/1, 2, 3, 503, 707/204; 705/16, 17, 18, 19, 20, 30; 715/503, 511

(56) References Cited

U.S. PATENT DOCUMENTS

| 5,101,352 | A | * | 3/1992 | Rembert | 705/8 |
|---|---|---|---|---|---|
| 5,584,025 | A | * | 12/1996 | Keithley et al. | 707/104.1 |
| 5,774,868 | A | * | 6/1998 | Cragun et al. | 705/10 |
| 5,918,215 | A | * | 6/1999 | Yoshioka et al. | 705/30 |
| 5,966,695 | A | * | 10/1999 | Melchione et al. | 705/10 |
| 6,067,525 | A | * | 5/2000 | Johnson et al. | 705/10 |
| 6,292,811 | B1 | * | 9/2001 | Clancey et al. | 707/503 |
| 6,390,366 | B1 | * | 5/2002 | Heidenreich et al. | 235/384 |
| 6,466,937 | B1 | * | 10/2002 | Fascenda | 707/10 |

* cited by examiner

Primary Examiner—John Breene
Assistant Examiner—Cheryl Lewis
(74) Attorney, Agent, or Firm—Trop, Pruner & Hu, P.C.

(57) ABSTRACT

A technique includes querying a first database that is associated with a sales order entry program for first entries that are associated with a transaction. A second database that is associated with an accounting program is queried for second entries that are associated with the transaction. In response to the querying the first and second databases, a file is generated that indicates a comparison between the first and second entries.

33 Claims, 7 Drawing Sheets

| ORDER NO. | PART NO. | CHANGE CLASS | ACCOUNT IDENTIFIER | CUSTOMER | AMOUNT |
|---|---|---|---|---|---|
| 83250 | 123 | ITEM | ACCT. 5 | XYC CO. | $ AA |
| 83250 | 123 | TAX | ACCT. 5 | XYC CO. | $ BB |
| 83250 | 123 | FREIGHT | ACCT. 5 | XYC CO. | $ CC |
| 83251 | 129 | RMA | ACCT. 9 | ZXK CO. | $ DD |
| ... | ... | ... | ... | ... | ... |

FIG. 3

| ORDER NO. | PART NO. | CHANGE CLASS | ACCOUNT IDENTIFIER | CUSTOMER | AMOUNT |
|---|---|---|---|---|---|
| 83250 | 123 | ITEM | ACCT. 5 | XYC CO. | $FF |
| 83250 | 123 | TAX | ACCT. 8 | XYC CO. | $ BB |
| 83250 | 129 | RMA | ACCT. 9 | ZXK CO. | $ DD |
| ... | ... | ... | ... | ... | ... |

FIG. 4

| RESULT | ORDER NO. | PART NO. | CHARGE CLASS | ACCOUNT IDENTIFIER | CUSTOMER | AMOUNT |
|---|---|---|---|---|---|---|
| F | 83250 | 123 | CO. 5 | ACCT. 5 | XYC CO. | *FF* |
| P | 83250 | 123 | TAX | ACCT. 8 | XYC CO. | $BB |
| F | **** | **** | **** | **** | **** | **** |
| F | 83250 | 129 | RMA | ACCT. 9 | ZXK CO. | $DD |

FIG. 6

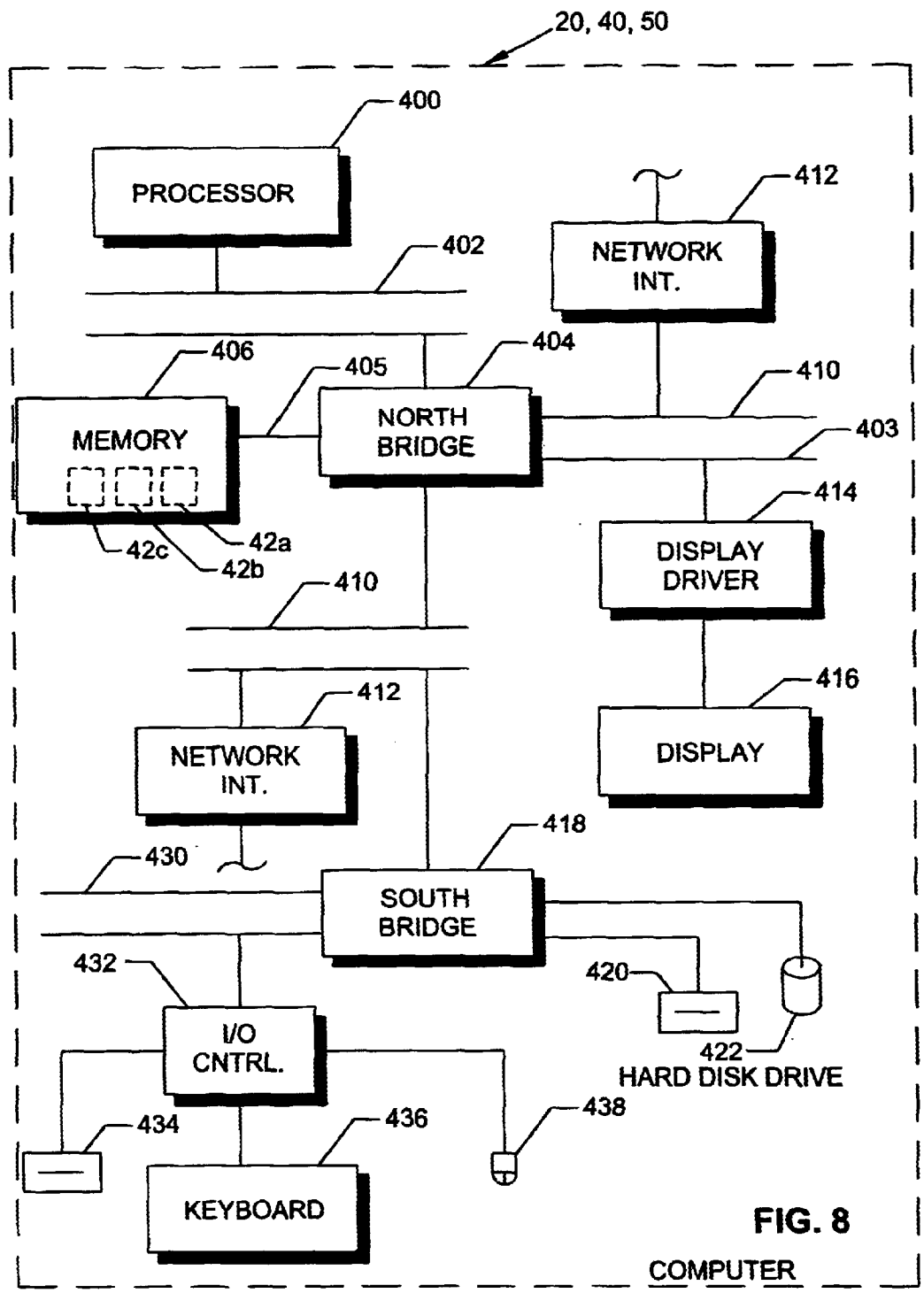

DATA VERIFICATION SYSTEM AND TECHNIQUE

BACKGROUND

The invention generally relates to a data verification system and technique.

Entries in a database may be created by the execution of one program, and after their creation, the entries may be transferred to another database for analysis or further processing by the execution of another program. For example, entries in sales order entry database may be generated by the execution of a sales order entry program. Subsequently, these entries may be transferred to a database that is used by an accounting program to perform bookkeeping functions with these entries.

In this manner, a salesperson may enter information relating to the sale of a particular item into a computer system that executes the sales order entry system, thereby creating data, or entries, in a sales order entry database. As an example, these entries are related to various line items that are associated with the sale. These line items may include the part numbers of items sold, the sales prices of the items, freight costs, taxes, etc.

For bookkeeping purposes, the entries in the sales order entry database may then be transferred into an accounting database that is associated with an accounting program. In this manner, the accounting program may be executed to import the entries from the sales order entry database into the accounting database.

Unfortunately, some of the entries in the accounting database may be invalid. The invalid data may be introduced by execution errors in the routine(s) that transfer the entries, operator error, and/or differences between the manners in which the two programs process the entries.

Thus, due to the possibility that some of the entries in the accounting database may be invalid, measures may be taken to validate these entries. One technique involves currently executing both the accounting and sales order entry programs in different windows (in a Windows® operating system, for example) and visually comparing the corresponding entries of the databases. However, this technique may be very time consuming. Alternatively, another program may be concurrently executed with the accounting and sales order entry programs for purposes of comparing the entries to determine what corrections need to be made. However, this technique requires the concurrent execution of three programs, thereby increasing the likelihood of crashing the computer system that is executing the three programs.

Thus, there is a continuing need for an arrangement that addresses one or more of the problems that are stated above.

SUMMARY

In an embodiment of the invention, a technique includes querying a first database associated with a sales order entry program for first entries that are associated with a transaction. A second database associated with an accounting program is queried for second entries that are associated with the transaction. In response to the querying the first and second databases, a file is generated that indicates a comparison between the first and second entries.

Other features and advantages of the invention will become apparent from the following description drawing and claims.

BRIEF DESCRIPTION OF THE DRAWING

FIG. 3 is an illustration of entries of a sales order entry database according to an embodiment of the invention.

FIG. 4 is an illustration of entries of an accounting database according to an embodiment of the invention.

FIG. 6 illustrates an exemplary image displayed by the spreadsheet program according to an embodiment of the invention.

FIG. 8 is a schematic diagram of a computer of the computer system of FIG. 1 according to an embodiment of the invention.

DETAILED DESCRIPTION

Figure 1:
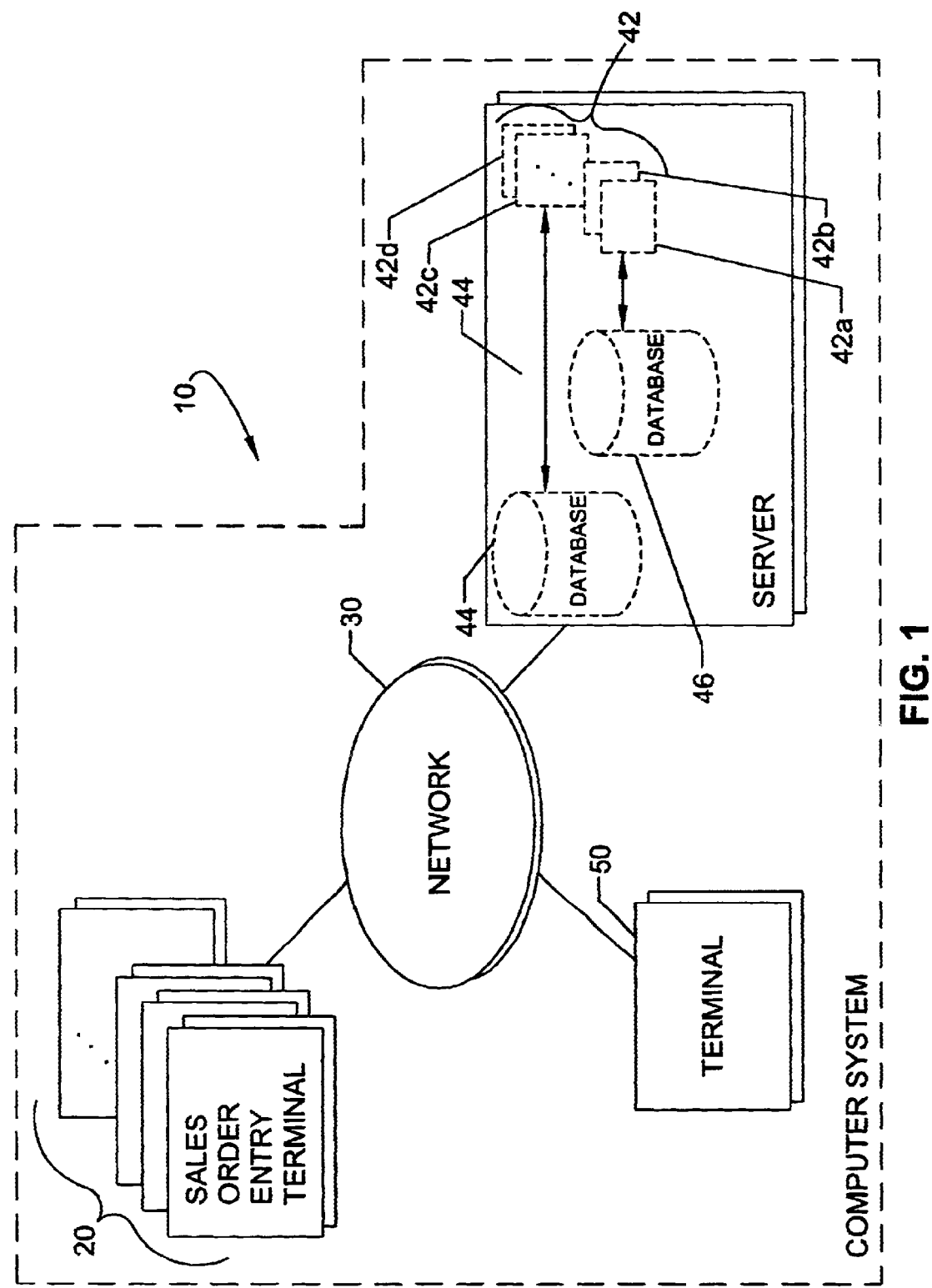
FIG. 1 is a schematic diagram of a computer system according to an embodiment of the invention.

Referring to FIG. 1, an embodiment 10 of a computer system in accordance with the invention includes sales order entry clients, or terminals 20, that communicate with a server 40 via a network 30. As an example, each sales order entry terminal 20 may be used by a salesperson to enter orders for items that are ordered by customers over the telephone. In some embodiments of the invention, the server 40 stores and executes various programs 42 (a sales order entry program 42a, an accounting program 42b, a query program 42c and a spreadsheet program 42d, as examples). The server 40 is capable of executing the sales order entry program 42a on different threads for the terminals 20. Thus, in this manner, the sales order terminals 20 may, via the execution of the sales order entry program 42a, create entries that the server 40 stores in a sales order entry database 44. The database may be located on the server 40.

Besides the sales order entry program 42a, the server 40 may execute an accounting program 42b for another terminal 50 that communicates with the server 40 via the network 30. As an example, the accounting program 42b may be an accounting program that is sold by Oracle®, for example, and the accounting program 42b may be used to perform typical bookkeeping operations, for example. The entries that are processed by the accounting program 42b are stored in an accounting database 46, a database that may be located on the server 40.

As an example, in some embodiments of the invention, each database 44, 46 may be a relational database that organizes its entries in rows and columns. The entries of a particular row may be associated with a line item of a particular sales transaction, as described below. Thus, in this manner, each entry of a particular row may indicate an attribute of the transaction, such as an amount of credit/debit, an account identifier or a charge class of the associated line item. In the databases 44 and 46, the rows are arranged in no particular order. For purposes of accessing entries that are associated with a particular row or rows, a Structured Query Language (SQL) query may be used, as described below.

Figure 2:
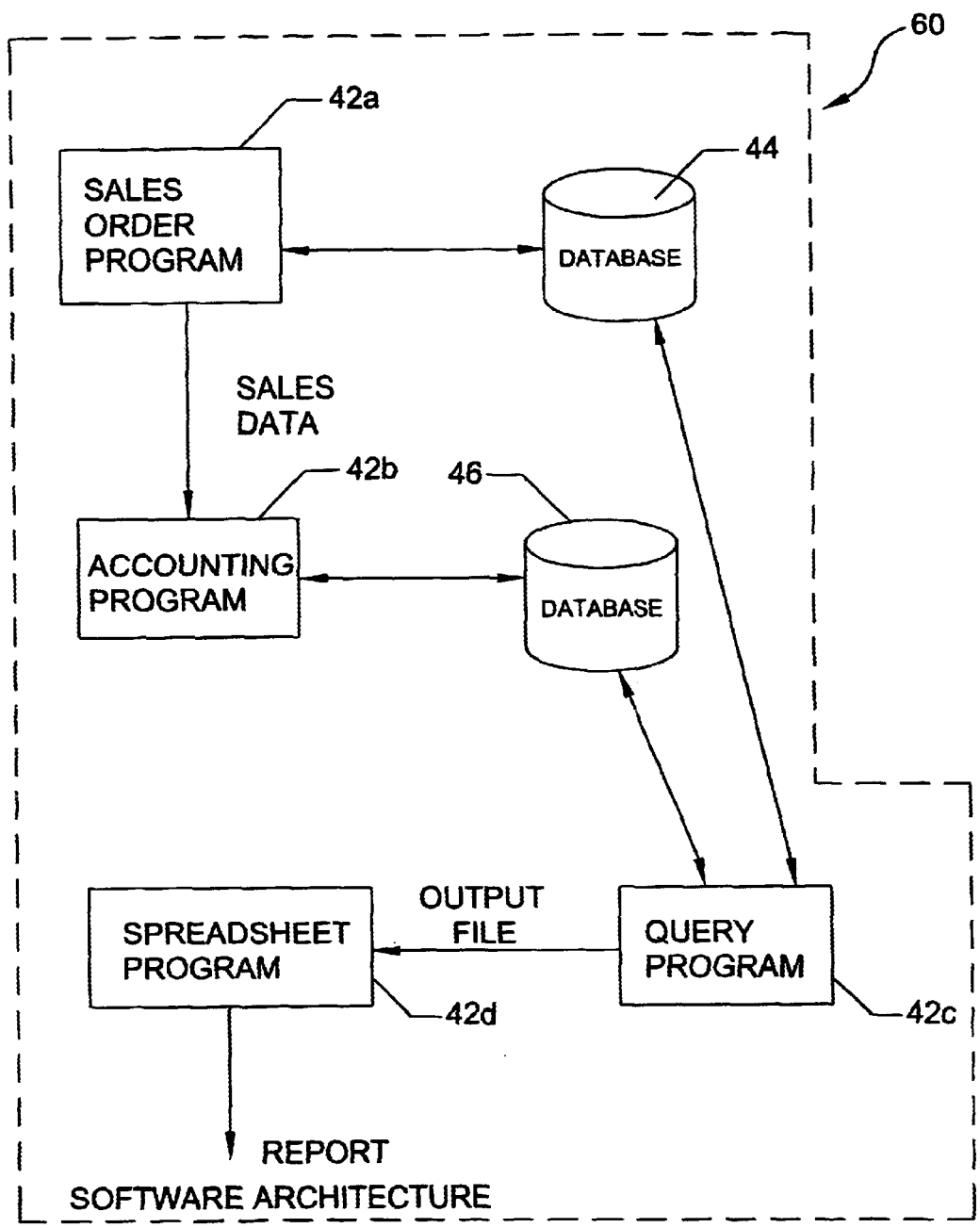
FIG. 2 is a schematic diagram of a software architecture of the computer system according to an embodiment of the invention.

Occasionally, as new entries in the sales order entry database 44 accumulate, the entries are transferred to the accounting database 46 for processing by the accounting program 42*b*. To accomplish this, the accounting program 42*b* may import data from the database 44 and store this data in the database 46, as depicted in a software architecture 60 of the computer system 10 in FIG. 2. Unfortunately, the transfer of entries between the databases 44 and 46 may not be error free, as some of the transferred entries may be invalid. Thus, based on the attribute that is indicated by a particular entry in the database 44, the attribute that is indicated by the corresponding entry in the database 46 may be incorrect. As a more specific example, a particular entry of the database 44 may indicate a tax of a certain amount on the sale of a particular item. However, the corresponding entry in the database 46 may indicate a different amount of tax. Possible causes of this discrepancy may be human error, an execution error that affects the transfer of the entries between the databases 44 and 46 and/or incompatibilities between the sales entry program 42*a* and the accounting program 42*b*, as just a few examples.

For purposes of ensuring the validity of the entries in the accounting database 46, in some embodiments of the invention, the server 40 executes a query program 42*c* to query both databases 44 and 46 for specific entries to be compared. For example, the query program 42*c*, when executed, may retrieve rows of entries from both databases 44 and 46 relating to a specific invoice number. Under the control of the query program 42*c*, the server 40 develops an output file that indicates a comparison of these entries. In this manner, in some embodiments of the invention, the server 40 generates an output file that is readable by spreadsheet program 42*d* (an Excel® spreadsheet program that is made by Microsoft®, for example). In this manner, the server 40 may subsequently execute the spreadsheet program 42*d* that reads the output file and generates a viewable image or images from which a viewer may visually compare the entries from the two databases 44 and 46 and quickly recognize incorrect entries in the database 46, as described in more detail below.

More specifically, in some embodiments of the invention, the sales order program 42*a* is executed to enter information concerning to specific transactions, such as transactions involving the sale or return or items. Each transaction may involve one or more line items, and each entry in the same row is associated with the same line item. Each entry in the same column is associated with a particular transaction attribute.

For example, FIG. 3 depicts exemplary entries in the sales order entry database 44. The entries are organized in columns 100 (columns 100*a*, 100*b*, 100*c*, 100*d*, 100*e* and 100*f*, as examples) and rows 102 (rows 102*a*, 102*b*, 102*c*, and 102*d*, as examples). The columns 100 are related to such transaction attributes as an Invoice Number (column 100*a*), a Part Number (column 100*b*), a Charge Class (column 100*c*), an Account Identifier (column 100*d*), Customer Identifier (column 100*e*) and an Amount (column 100*f*).

As an example of the generation of these entries, a customer called "XYZ Co." may place an order that the sales order program 42*a* assigns an invoice number of "83250." This order may involve the purchase of an item that has a part number of "123." Therefore, in response to the order, the sales order program 42*a* may, as an example, create three rows 102*a*, 102*b* and 102*c* of entries that correspond to three line items that describe the transaction. The row 102*a* is associated with the cost of the item itself, as indicated by the entry in the "Charge Class" column-indicating "Item." The item has a cost of $AA dollars (column 100*f*), and the amount of the sale is credited to Account 5 (column 100*d*).

This exemplary transaction may include other line items that are associated with other rows, such as a row 102*b* that is associated with the sales tax (as indicated by column 100*c*) of the purchased item and a row 102*c* that is associated with the freight (as indicated by column 100*c*) charge that is included in the transaction. The tax and freight charges are entries at column 100*f* in rows 102*b* and 102*c*, respectively.

As another example, row 102*d* is associated with a line item of another transaction, a transaction in which a customer called "ZXK Co." returns an item having part number "129" (column 100*b*) and is given a refund. Row 102*d* reflects the transaction by the entry of return merchandise authorization (RMA) code in the charge class column 100*c* and the refumded amount in column 100*f*. The amount of the refund is debited from Account Number 9 (column 100*e*).

FIG. 4 depicts entries in the accounting database 46 that are created as a result of the transfer of the entries of FIG. 3 from the sales order entry database 44. In this manner, the rows 110*a*, 110*b*, 110*c* and 110*d* of entries of FIG. 4 correspond to the rows 102*a*, 102*b*, 102*c* and 102*d*, respectively, of FIG. 3, and the columns 108*a*, 108*b*, 108*c*, 108*d*, 108*e* and 108*f*, respectively, of FIG. 4 correspond to the columns 100*a*, 100*b*, 100*c*, 100*d*, 100*e*, respectively, of FIG. 3.

As an example of possible comparisons that may be made between the entries, although the amount ($FF) in column 108*f* of row 110*a* should be the same as the amount ($AA) in column 100*f* of row 102*a*, these amounts are different. This inconsistency is flagged by the execution of the spreadsheet program 42*d*, as described below.

As another example of possible comparisons, the information in row 110*b* is the same as the information in row 102*b* except that the tax is credited to "Account 5" in row 102*b* and is credited to "Account 8" in row 110*b*. Although different accounts, the entry in FIG. 4 may still be valid, as the accounting program 42*b* may have more information concerning the accounts to which taxes are posted. For example, the sales order entry program 42*a* may credit the tax to the same account (Account 5) as the account that is associated with the item that was sold. However, the accounting program 42*b* may be configured to convert all tax credits to "Account 5" to Account 8". Therefore, the entry at row 110*b* and column 108*d* is valid.

As another example, it is possible that the row 102*c* of entries in the database 44 does not a have a corresponding row in the database 46, as depicted by the blank row 110*c*. As yet another example, row 110*d* is associated with an RMA debit. The entry at column 108*d* of row 110*d* includes an "Account 9" that may appear to be valid as this account is the same account that is indicated by the entry that is indicated at column 100*d* of row 102*d*. However, similar to the row 110*b* that is described above, the accounting program 42*b* may be configured to debit an account other than "Account 9" for RMA transactions. Thus, the accounting program 42*b* should take care of this conversion, although, as depicted in FIGS. 3 and 4, this conversion may not occur.

The query program 42*c*, generates queries to the databases 44 and 46 to extract corresponding entries from both databases 44 and 46. For example, to retrieve the row 102*c* (see FIG. 3), the query program 42*c*, when executed, causes the server 40 to submit a Structured Query Language (SQL) query to the database 44 to retrieve a row that includes an order number of "83250" and a charge class of "Freight." The query program 42*c* uses this same selection criteria when retrieving the corresponding row 110*c* from the database 46. In some embodiments of the invention, each SQL query may result in the transfer of more than one row of entries from the database 44, 46.

Figure 5:
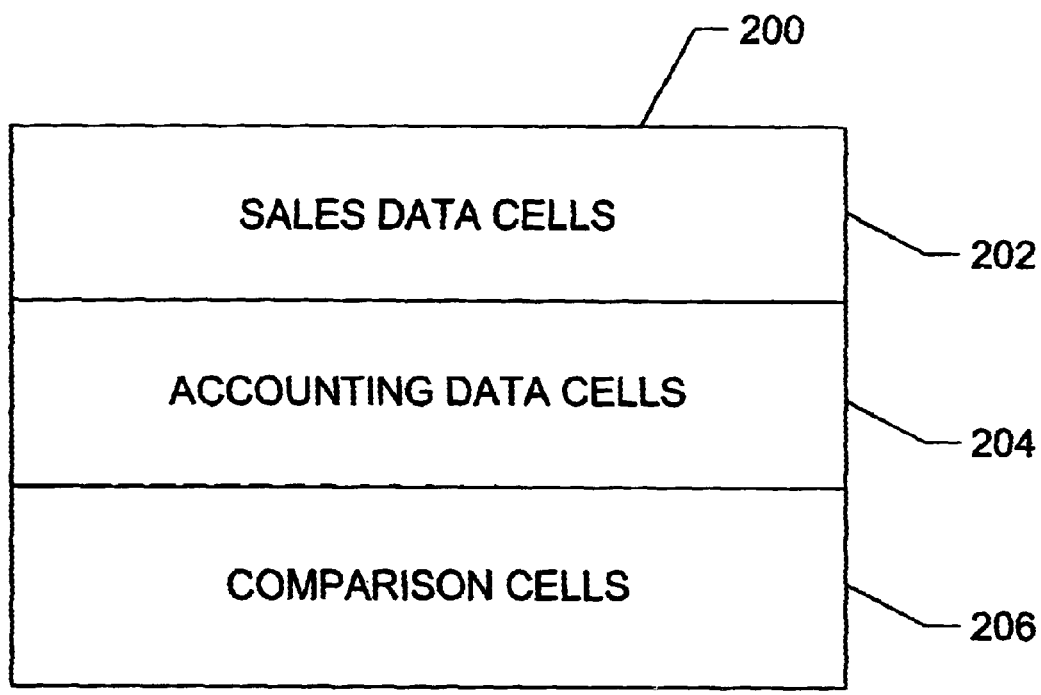
FIG. 5 is an illustration of an organization of cells that are displayed by a spreadsheet program according to an embodiment of the invention.

Using the queries to obtain the entries to be compared, the query program 42c creates an output file that, when opened by the execution of the spreadsheet program 42d, causes the program 42d to display a spreadsheet image 200 that is depicted in FIG. 5. The spreadsheet image 200 includes cells 202 for displaying the entries that were retrieved from the database 44 and cells 204 for displaying the corresponding entries that were retrieved from the database 46. In this manner, in some embodiments of the invention, the entries in the cells 202 and 204 are displayed in row and column format, similar to the format that is depicted in FIGS. 3 and 4.

Besides the cells 202 and 204, in some embodiments of the invention, the output file sets up comparison cells 206. As its name implies, each comparison cell 206 performs a comparison between the entry in a particular cell 202 and the entry in a particular cell 204. The comparison cells 206 are organized in rows and columns and display the results of the comparisons. The formula that the query program 42c stores in each comparison cell 206 for purposes of comparison is a function of the column position of the cell. For example, comparison cells 206 that compare dollar amounts may be programmed to do a straight comparison of the corresponding entries in the cells 202 and 204, and comparison cells 206 that compare account numbers may base the comparison on other criteria, as described above.

As an example, FIG. 6 depicts the results that are displayed by the comparison cells 206 when comparing the entries that are depicted in FIGS. 3 and 4. As shown, the entries that are displayed by the comparison cells 206 are arranged in rows and columns that correspond to the organization that is depicted in these FIG. 3 and 4. For example, the rows 130a, 130b, 130c and 130d of the comparison cells 206 correspond to the rows 102a, 102b, 102c and 102d, respectively, of entries of FIG. 3 and correspond to the rows 110a, 110b, 110c and 110d, respectively, of entries of FIG. 4. The columns 120a, 120b, 120c and 120d of the comparison cells 206 correspond to the columns 100a, 100b, 100c and 100d, respectively, of the elements of FIG. 3 and correspond to the columns 108a, 108b, 108c and 108d, respectively, of the elements of FIG. 4. Thus, for example, the comparison cell 206 that is located at the intersection of column 120c and row 130a compares the entry that is located at the intersection of column 100c and row 102a with the entry that is located at the intersection of column 108c and row 110a.

In some embodiments of the invention, the comparison cells 206 display the entries of the database 46 and identify (by asterisks, for example) the entries that may be invalid. As depicted in FIG. 6, the comparison cells 206 may, in some embodiments of the invention, include an additional column 120g that is a results column. Each cell of the results column 120g identifies whether the cells of the associated row have detected a validity problem. For example, a particular cell of the column 120g may display an "F" to indicate a failure in the associated row or a "P" to indicate that the elements of the associated row are validated.

For example, as described above for the elements that are shown in FIGS. 3 and 4, the comparison cell at the intersection of row 130a and 120f that compares the element at the intersection of row 102a and column 100f with the element at the intersection of row 110a and 108f. Because the associated charge class is an item, this cell determines whether the two compared entries are equal. Since they are not equal (for this example), the cell displays "**$FF*", the entry "$FF" indicated by the accounting data surrounded by asterisks to indicate that the entry is invalid.

Figure 7:
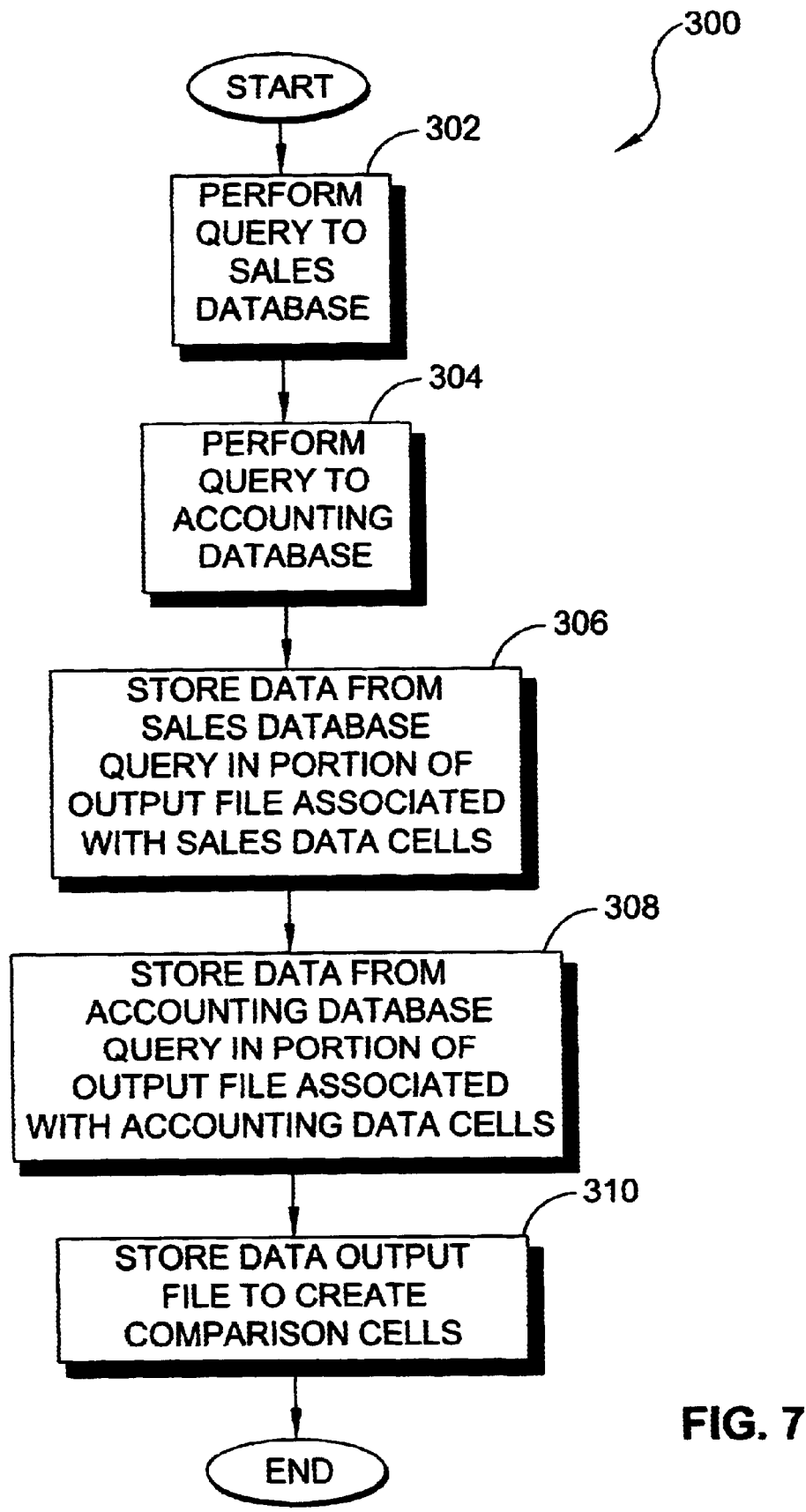
FIG. 7 is a flow diagram depicting a routine to develop input data for the spreadsheet program according to an embodiment of the invention.

Referring to FIG. 7, to summarize, a technique 300 to validate entries in the accounting database 46 includes performing (block 302) a query to the sales order entry database 44 to retrieve specified rows and performing (block 304) a query to the accounting database 46 to retrieve the corresponding rows in the database 46. Next, these entries are used to create the output file that, when opened by the spreadsheet program 42c, creates the sales data cells 202 and the accounting data cells 204, as indicated in blocks 306 and 308. Lastly, data is stored in the output file to create the comparison cells 206 that compare the corresponding entries in the cells 202 and 204 to generate an image that visually indicates the results of the comparison.

FIG. 8 is a schematic diagram of a computer that may be used as one of the terminals 20, the terminal 50 or the server 40, as a few examples. The computer includes a processor 400 (a microprocessor, for example) that may be coupled to a local bus 402 along with a north bridge 406. The north bridge 406 may represent a collection of semiconductor devices, or "chip set," and provide interfaces to a Peripheral Component Interconnect (PCI) bus 410 and an AGP bus 403. The PCI Specification is available from The PCI Special Interest Group, Portland, Oreg. 97214. The AGP is described in detail in the Accelerated Graphics Port Interface Specification, Revision 1.0, published on Jul. 31, 1996, by Intel Corporation of Santa Clara, Calif.

A display driver 414 may be coupled to the AGP bus 403 and provide signals to drive a display 416. The PCI bus 410 may be coupled to a network interface 412 that couples the computer to the network 30 (see FIG. 1). The north bridge 404 may also include a memory controller to communicate data over a memory bus 405 with a memory 406. As an example, the memory 406 may store all or a portion of the instructions of the sales accounting program 42a, the accounting program 42b and/or the query program 42c. The PCI bus 410 may also be coupled to a south bridge 418.

The south bridge 418 provides interfaces for a hard disk drive 422, a CD-ROM drive 420 and an I/O expansion bus 430, as just a few examples. The hard disk drive 422 may store all or a portion of the instructions of the sales accounting program 42a, the accounting program 42b and/or the query program 42c. As an example one or more hard disk drives (such as the hard disk drive 422) of the server 40 may store the databases 44 and 46. An I/O controller 432 may be coupled to the I/O expansion bus 430 to receive input data from a mouse 438 and a keyboard 436. The I/O controller 432 may also control operations of a floppy disk drive 434.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   querying a first database associated with a sales order entry program for first entries associated with a transaction;
   querying a second database associated with an accounting program for second entries associated with the transaction; and in response to the querying the first and second databases, generating a file indicating a comparison between the first and second entries.

2. The method of claim 1, wherein the file causes a spreadsheet program to display an image visually depicting the comparison.

3. The method of claim 1, wherein the querying the first databases comprises:
furnishing a structured query language query to the first database.

4. The method of claim 1, wherein the querying the first databases comprises:
furnishing a structured query language query to the second database.

5. The method of claim 1, wherein the entries are associated with at least one of an amount, a charge class and an account.

6. The method of claim 1, wherein the file indicates whether predefined relationships exist between the first and second entries.

7. The method of claim 1, wherein the first entries comprise rows of entries, each row associated with a line item of the transaction.

8. The method of claim 1, wherein the second entries comprise rows of entries, each row associated with a line item of the transaction.

9. The method of claim 1, wherein the generating comprises:
generating a spreadsheet input file to cause cells displayed by a spreadsheet program to display the first entries.

10. The method of claim 1, wherein the generating comprises:
generating a spreadsheet input file to cause cells displayed by a spreadsheet program to display the second entries.

11. The method of claim 1, wherein the generating comprises:
generating a spreadsheet input file to cause cells displayed by a spreadsheet program to display a comparison between the first and second entries.

12. An article comprising a computer readable storage medium storing instructions to cause a processor to:
query a first database associated with a sales order entry program for first entries associated with a transaction;
query a second database associated with an accounting program for second entries associated with the transaction; and
in response to the queries of the first and second databases, generate a file indicating a comparison between the first and second entries.

13. The article of claim 12, wherein the file causes a spreadsheet program to display an image visually depicting the comparison.

14. The article of claim 12, the program comprising instructions to cause the processor to furnish a structured query language query to the first database.

15. The article of claim 12, the program comprising instructions to cause the processor to furnish a structured query language query to the second database.

16. The article of claim 12, wherein the entries are associated with at least one of an amount, a charge class and an account.

17. The article of claim 12, wherein the file indicates whether predefined relationships exist between the first and second entries.

18. The article of claim 12, wherein the first entries comprise rows of entries, each row associated with a line item of the transaction.

19. The article of claim 12, wherein the second entries comprise rows of entries, each row associated with a line item of the transaction.

20. The article of claim 12, the program comprising instructions to cause the processor to generate a spreadsheet input file to cause cells displayed by a spreadsheet program to display the first entries.

21. The article of claim 12, the program comprising instructions to cause the processor to generate a spreadsheet input file to cause cells displayed by a spreadsheet program to display the second entries.

22. The article of claim 12, the program comprising instructions to cause the processor to generate a spreadsheet input file to display a comparison between the first and second entries.

23. A computer system comprising:
a processor;
mass storage storing a first database associated with a sales order entry program and a second database associated with an accounting program, the first database having first entries associated with a transaction and the second database having second entries associated with the transaction; and
a memory storing instructions to cause the processor to:
query the first database for the first entries,
query the second database for the second entries, and
in response to the queries of the first and second databases, generate a file indicating a comparison between the first and second entries.

24. The computer system of claim 23, wherein the file causes a spreadsheet program to display an image visually depicting the comparison.

25. The computer system of claim 23, the program comprising instructions to cause the processor to furnish a structured query language query to the first database.

26. The computer system of claim 23, the memory storing instructions to cause the processor to furnish a structured query language query to the second database.

27. The computer system of claim 23, wherein the entries are associated with at least one of an amount, a charge class and an account.

28. The computer system of claim 23, wherein the file indicates whether a predefined relationships exist between the first and second entries.

29. The computer system of claim 23, wherein the first entries comprise rows of entries, each row associated with a line item of the transaction.

30. The computer system of claim 23, wherein the second entries comprise rows of entries, each row associated with a line item of the transaction.

31. The computer system of claim 23, the memory storing instructions to cause the processor to generate a spreadsheet input file to cause cells displayed by a spreadsheet program to display the first entries.

32. The computer system of claim 23, the memory storing instructions to cause the processor to generate a spreadsheet input file to cause cells displayed by a spreadsheet program to display the second entries.

33. The computer system of claim 23, the memory storing instructions to cause the processor to generate a spreadsheet input file to display a comparison between the first and second entries.

* * * * *